US012686819B2

(12) United States Patent
Alamri

(10) Patent No.: US 12,686,819 B2
(45) Date of Patent: Jul. 21, 2026

(54) CORROSION INHIBITOR COMPOSITION FOR USE IN THE OIL AND GAS INDUSTRY

(71) Applicant: Imam Abdulrahman Bin Faisal University, Dammam (SA)

(72) Inventor: Aeshah Hassan Saeed Alamri, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 987 days.

(21) Appl. No.: 17/940,693

(22) Filed: Sep. 8, 2022

(65) Prior Publication Data

US 2024/0110096 A1 Apr. 4, 2024

(51) Int. Cl.

| | |
|---|---|
| ***A01N 31/00*** | (2006.01) |
| ***C04B 9/02*** | (2006.01) |
| ***C09K 3/00*** | (2006.01) |
| ***C09K 8/54*** | (2006.01) |
| ***C09K 15/12*** | (2006.01) |
| ***C09K 15/28*** | (2006.01) |
| ***C09K 15/30*** | (2006.01) |
| ***C10G 75/02*** | (2006.01) |

(Continued)

(52) U.S. Cl.

CPC ................ *C09K 15/30* (2013.01); *C09K 8/54* (2013.01); *C09K 15/12* (2013.01); *C09K 15/28* (2013.01); *C10G 75/02* (2013.01); *C23F 11/147* (2013.01); *C09K 2208/32* (2013.01); *C10G 2300/4075* (2013.01)

(58) Field of Classification Search

CPC .... C09K 5/10; C09K 5/20; C09K 3/00; C23F 11/02; A01N 25/10; C23C 22/05

USPC .......... 504/354; 106/14.2; 148/243; 252/387

See application file for complete search history.

(56) References Cited

U.S. PATENT DOCUMENTS 4,333,850 A 6/1982 Krueger
4,541,946 A * 9/1985 Jones ................ B01D 19/0404 252/189

(Continued)

FOREIGN PATENT DOCUMENTS

CN 107163844 B 4/2019
JP 5170963 B2 3/2013

OTHER PUBLICATIONS

Eduok, et al. ; Synthesis and characterization of protective silica reinforced hybrid poly(vinylpyrrolidone)/acrylate/silane nanocomposite coatings ; New Journal of Chemistry, Issue 3 ; 2020 ; Abstract Only; 6 Pages.

(Continued)

*Primary Examiner* — Monzer R Chorbaji
(74) *Attorney, Agent, or Firm* — Oblon, McClelland, Maier & Neustadt, L.L.P.

(57) ABSTRACT

A corrosion inhibitor composition is described. The corrosion inhibitor composition includes 1 to 15 weight percentage (wt. %) of a polymer having at least one vinylpyrrolidone unit and at least one vinyl acetate unit, 0.1 to 1 wt. % of a thioamide having 2 to 20 carbon atoms, 1 to 5 wt. % of a thioalcohol having 2 to 8 carbon atoms, 1 to 3 wt. % of a surfactant, 0 to 15 wt. % of an aliphatic alcohol having 1 to 8 carbon atoms, 30 to 60 wt. % of a solvent, and each wt. % based on a total weight of the corrosion inhibitor composition. The present disclosure also describes a method for inhibiting corrosion of a metal with the corrosion inhibitor composition of the present disclosure.

18 Claims, 2 Drawing Sheets

(51) Int. Cl.
*C23C 22/00* (2006.01)
*C23F 11/14* (2006.01)

(56) References Cited

U.S. PATENT DOCUMENTS

| | | | | |
|---|---|---|---|---|
| 6,365,067 | B1 * | 4/2002 | Ahn | C23F 11/161 422/7 |
| 6,569,261 | B1 * | 5/2003 | Aubay | C11D 3/3769 134/40 |
| 7,057,050 | B2 | 6/2006 | Meyer | |
| 8,114,206 | B2 | 2/2012 | Hayes et al. | |
| 8,372,336 | B2 | 2/2013 | Hellberg et al. | |
| 8,618,027 | B2 | 12/2013 | Meyer et al. | |
| 8,969,263 | B2 | 3/2015 | Misra et al. | |
| 9,187,650 | B2 | 11/2015 | Jaworowski et al. | |
| 9,670,430 | B2 * | 6/2017 | Lange | C10L 1/2335 |
| 10,072,339 | B2 | 9/2018 | Krasnow et al. | |
| 10,927,289 | B2 | 2/2021 | Reyes et al. | |
| 11,180,856 | B1 * | 11/2021 | Obot | C23F 11/185 |
| 2003/0138567 | A1 | 7/2003 | Schenzle et al. | |
| 2007/0023735 | A1 | 2/2007 | Biscoglio et al. | |
| 2008/0292674 | A1 * | 11/2008 | Crudden | A23B 2/788 514/498 |
| 2011/0189245 | A1 * | 8/2011 | Terzian | A61K 9/286 427/2.14 |
| 2014/0200168 | A1 | 7/2014 | Misra et al. | |
| 2015/0069301 | A1 | 3/2015 | Sun et al. | |
| 2018/0030000 | A1 | 2/2018 | Gill et al. | |
| 2018/0030345 | A1 * | 2/2018 | Gill | C23F 11/04 |
| 2021/0395898 | A1 | 12/2021 | Ul-Haq et al. | |

OTHER PUBLICATIONS

ASTM International, Designation:G3-14 ; Standard Practice for Conventions Applicable to Electrochemical Measurements in Corrosion Testing ; 2014 ; 9 Pages.

Nesic, et al. ; An Electrochemical Model for Predication of Corrosion of Mild Steel in Aqueos Carbon Dioxide Solutions ; Corrosion Science ; Apr. 1996 ; 15 Pages.

Mustafa, et al. ; Inhibition of CO2 Corrosion of X52 Steel by Imidazoline-Based Inhibitor in High Pressure CO2-Water Environment ; Journal of Materials Engineering and Performance 22 ; Dec. 4, 2012 ; Abstract Only ; 9 Pages.

Jovancicevic, et al. ; Inhibition of Carbon Dioxide Corrosion of Mild Steel by Imidazolines and Their Precursors ; Corrosion Science ; May 1, 1999 ; Abstract Only ; 5 Pages.

Farelas, et al. ; Carbon Dioxide Corrosion Inhibition of Carbon Steels Through Bis-imidazoline and Imidazoline Compounds Studied by EIS ; International Journal of Electrochemical Science, 5 ; Jun. 20, 2010 ; 19 Pages.

Rajendran, et al. ; Corrosion behavior of carbon steel in polyvinyl alcohol ; Anti-Corrosion Methods and Materials; Bradford vol. 52, Issue 2 ; 2005 ; Abstract Only ; 2 pages.

* cited by examiner

CORROSION INHIBITOR COMPOSITION FOR USE IN THE OIL AND GAS INDUSTRY

BACKGROUND

Technical Field

The present disclosure is directed to a composition, particularly to polymer-based corrosion inhibitor compositions for the protection of pipelines used in the oil and gas industry. The present disclosure also provides a method for inhibiting corrosion on a metal surface used in the oil and gas industry.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Steel is the most used structural material for the construction of pipelines, tubing, and storage tanks in the oil and gas industry [Nesic, S., Postlethwaite, J., Olsen, S. An electrochemical model for prediction of corrosion of mild steel in aqueous carbon dioxide solutions, Corrosion 52 (1996) 280-294; Mustafa, A. H., Ari-Wahjoedi, B., Ismail, M. C. Inhibition of $CO_2$ corrosion of X52 steel by imidazoline-based inhibitor in high-pressure $CO_2$-water environment, Materials Engineering & Performance 22 (2013) 1748-1755; Jovancicevic, V., Ramachandran, S., Prince, P. Inhibition of carbon dioxide corrosion of mild steel by imidazolines and their precursors, Corrosion 55(1999) 449-455; Farelas, F., Ramirez, A. Carbon dioxide corrosion inhibition of carbon steels through bis-imidazoline and imidazoline compounds studied by EIS, Int. J. Electrochemical Science 5 (2010) 797-814]. However, it suffers from severe material degradation due to $CO_2$ and $H_2S$-induced corrosion. Corrosion can build up in the wellbore tubular, downhole components, and transportation pipelines, costing the oil and gas industries millions of dollars yearly. One of the most practical and cost-effective approaches for mitigating aqueous corrosion in the oil and gas industry is using chemical agents called corrosion inhibitors.

Conventionally [US Patent Application No. 2015/0069301 A1; U.S. Pat. No. 7,057,050 B2; U.S. Pat. No. 8,618,027 B2], inhibitor compositions used in the oil and gas wells include several nitrogen-containing compounds, such as amines, imidazolines, amides, and quaternary ammonium salts, often in combination with other types of inhibitors, including alkoxylated phosphate esters, intensifiers, and surfactants. These inhibitors adsorb on the metal surface by forming a film and reducing the corrosion rate in aggressive corrosive environments. However, most conventionally used corrosion inhibitors suffer from drawbacks such as high costs and/or high toxicity.

Recently, polymer-based inhibitor compositions have been used as corrosion inhibitors to mitigate sweet corrosion in oil and gas production. Polymer compositions serve as effective corrosion inhibitors owing to their functional groups, forming complexes with metal ions and on the metal surface. These complexes occupy a large surface area, thereby blanketing the surface and protecting the metal from corrosive agents present in the solution [Rajendran, S., Sridevi, S. P., Anthony, N., Amalraj, A. J., Sundearavadivelu M. Corrosion behavior of carbon steel in polyvinyl alcohol, Anti-Corrosion Methods Mater 52(2) (2005) 102-107]. The presence of heteroatoms such as nitrogen and oxygen atoms can provide active centers for interacting with the pipeline surface, thereby protecting it from corrosion.

For example, US 2021/0395898 A1 discloses using a hyperbranched polymer as a corrosion inhibitor for an oil pipeline. U.S. Pat. No. 9,187,650 B2 discloses a conductive polymer corrosion protective composite for use as a coating. US 2014/0200168A1 discloses a treatment fluid consisting of water, a carboxylate, and a corrosion inhibitor. The corrosion inhibitor is an environmentally friendly, biodegradable polymer containing a carbohydrate backbone and a quaternary amine functional group. US 2007/0023735A1 further discloses a polymeric composition including a polymer, a cathodic corrosion inhibitor, and an acidic corrosive agent. This composition is used as coating and applied over a wire or cable. U.S. Pat. No. 8,372,336 B2 discloses the use of a polymeric product, obtained by the reaction of an alkoxylated fatty amine with a dicarboxylic acid, as a corrosion inhibitor for metal surfaces. U.S. Pat. No. 10,927,289 2 discloses the use of polyhydroxyetheramines to inhibit the corrosion of metal surfaces. The polymeric corrosion inhibitor is used along with a corrosion inhibitor intensifier during acid treatment in a subterranean formation.

Although some polymers have been engaged in developing corrosion inhibitor in the past, there still exists a need to develop a low-cost, environmentally friendly, non-toxic polymer based corrosion inhibitor compositions for corrosion mitigation in the oil and gas industry.

In view of the forgoing, one objective of the present disclosure is to describe a corrosion inhibitor composition for use in the oil and gas industry. A further objective of the present disclosure is to provide methods for inhibiting corrosion of a metal in contact with a corrosive fluid containing the corrosion inhibitor composition.

SUMMARY

In an exemplary embodiment, a corrosion inhibitor composition is described. The corrosion inhibitor composition includes 1 to 15 weight percentage (wt. %) of a polymer having at least one vinylpyrrolidone unit and at least one vinyl acetate unit, 0.1 to 1 wt. % of a thioamide having 2 to 20 carbon atoms, 1 to 5 wt. % of a thioalcohol having 2 to 8 carbon atoms, 1 to 3 wt. % of a surfactant; 0 to 15 wt. % of an aliphatic alcohol having 1 to 8 carbon atoms, 30 to 60 wt. % of a solvent; and each wt. % based on a total weight of the corrosion inhibitor composition.

In some embodiments, the polymer is a poly(1-vinylpyrolidone-co-vinylacetate).

In some embodiments, the poly(1-vinylpyrolidone-co-vinylacetate) has a formula (I)

[I]

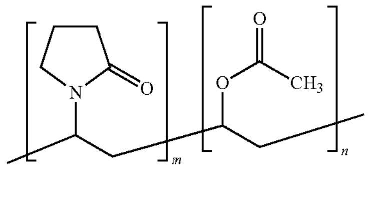

where m is an integer from 1 to 600 inclusive, and n is an integer from 1 to 600 inclusive.

In some embodiments, the thioamide is thiobenzamide.

In some embodiments, the thioalcohol is 2-mercaptoethanol.

In some embodiments, the surfactant is a non-ionic surfactant of formula (II)

[II]

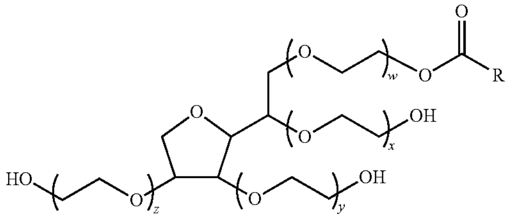

where R is selected from the group consisting of a hydrocarbon chain having 8 to 22 carbon atoms, an optionally substituted alkyl, and an optionally substituted cycloalkyl. In some embodiments, each of w, x, y, and z is an integer of 1 to 20 inclusive. In some embodiments, the integers collectively denoted as w+x+y+z=20.

In some embodiments, the non-ionic surfactant is polyoxyethylene (20) sorbitan monooleate, in which R is an 8-heptadecene group having 17 carbon atoms.

In some embodiments, the aliphatic alcohol is methanol.

In some embodiments, the solvent is water.

In another exemplary embodiment, a method for inhibiting corrosion of a metal in contact with a corrosive fluid is described. The method includes adding the corrosive fluid in the corrosion inhibitor composition in an amount of 10 to 1000 parts per million (ppm) based on a total number of parts by weight of the corrosive fluid.

In some embodiments, the corrosive fluid is an aqueous solution.

In some embodiments, the corrosive fluid includes carbon dioxide ($CO_2$) and/or halides (R—X, where X may be fluorine, chlorine, bromine, or iodine atom) in an amount of at least 0.5 grams (g) carbon dioxide and/or halides per kilograms (kg) of the corrosive fluid.

In some embodiments, the halides are in the form of an alkali metal halide salt (MX, where M is an alkali metal and X is a halogen).

In some embodiments, the method of inhibiting corrosion includes the alkali metal halide salt which is present in an amount of 1 to 5 wt. % based on the total weight of the corrosive fluid.

In some embodiments, the alkali metal halide salt is sodium chloride (NaCl).

In some embodiments, the metal is steel.

In some embodiments, the steel is a carbon steel.

In some embodiments, the metal is in contact with the corrosive fluid at 25 to 100 degrees centigrade (° C.).

In some embodiments, the metal is part of a casing, a pipe, a pump, a screen, a valve, or a fitting of an oil or gas well.

In some embodiments, the method of the present disclosure has an inhibition efficiency of greater than 90% when the metal is in contact with the corrosive fluid at 25 to 75° C. for 10 to 480 minutes (mins) by following the American Society for Testing and Materials (ASTM) G59 standard test method.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
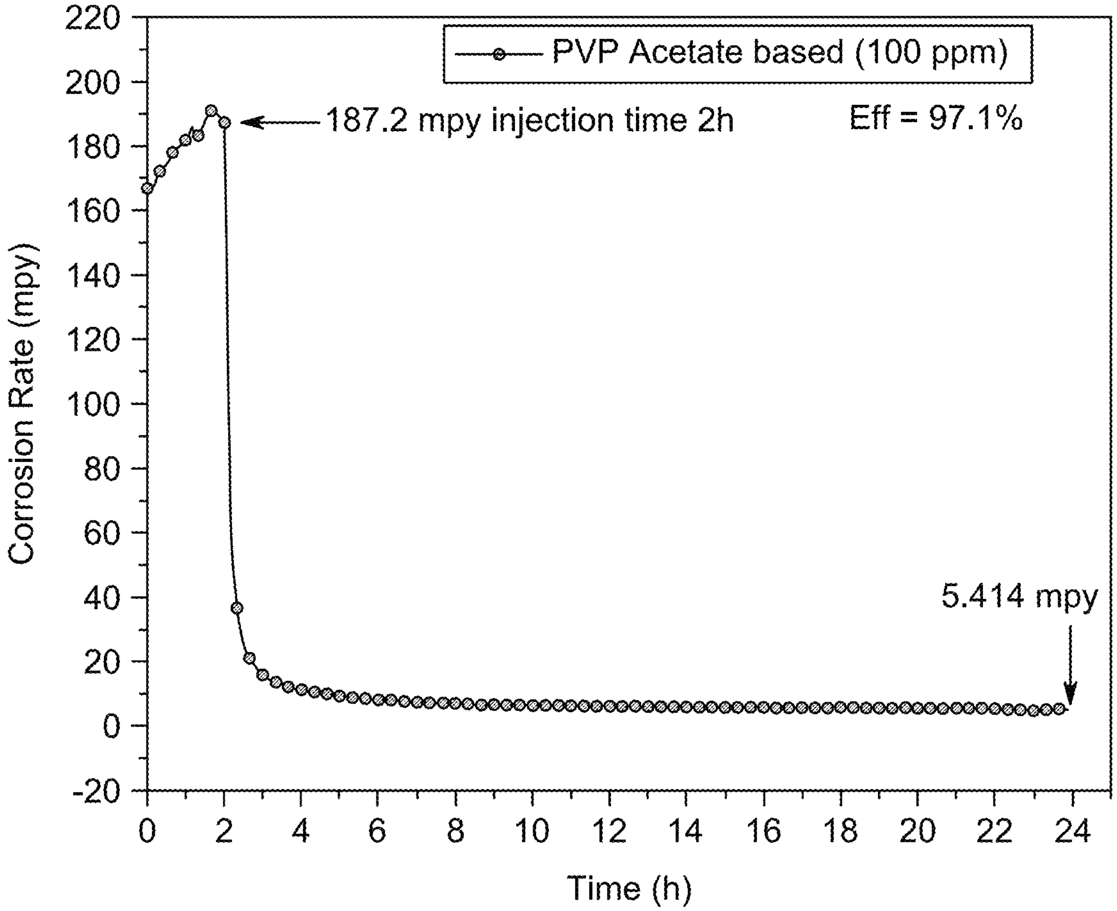
FIG. 1 illustrates a plot depicting the variation of corrosion rate with a time of a C1018 carbon steel coupon in 3.5 wt. % sodium chloride (NaCl) in saturated carbon dioxide ($CO_2$) at 55 (° C.) after the addition of 100 parts per million (ppm) of the corrosion inhibitor composition after 2 hours pre-corrosion, according to certain embodiments.

In the following description, it is understood that other embodiments may be utilized, and structural and operational changes may be made without departure from the scope of the present embodiments disclosed herein.

In the drawings, reference numerals designate identical or corresponding parts throughout the several views. Further, as used herein, the words “a,” “an” and the like generally carry a meaning of “one or more,” unless stated otherwise.

Furthermore, the terms “approximately,” “approximate,” “about,” and similar terms generally refer to ranges that include the identified value within a margin of 20%, 10%, or preferably 5%, and any values therebetween.

As used herein, the term “polymer” refers to a molecule including repeating subunits (e.g., polymerized monomers).

As used herein, the term “corrosion” refers to a natural process that converts a refined metal into a more chemically stable oxide.

As used herein the term “corrosion inhibitor” refers to a substance(s) that prevents or reduces the deterioration of a metal surface by oxidation or other chemical reaction. Corrosive substances that can cause corrosion, particularly of metal surfaces of equipment used during stimulation operations, include water with high salt contents, acidic inorganic compounds such as hydrochloric acid, hydrofluoric acid, carbon dioxide ($CO_2$) and/or hydrogen sulfide ($H_2S$), organic acids, and microorganisms. Preferred corrosion inhibitors of the present invention reduce, inhibit and/or prevent the destructive effect such substances have on various metal surfaces.

As used herein, the term “fatty” describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered “fatty” compounds herein. For example, stearic acid, which has 18 carbons total (a fatty portion with 17 carbon atoms and 1 carbon atom from the —COOH group), is considered to be a fatty acid having 18 carbon atoms herein.

As used herein, “optionally substituted” means that at least one hydrogen atom is replaced with a non-hydrogen group, provided that normal valencies are maintained and that the substitution results in a stable compound. Such optional substituents may be selected from aryl, alkoxy, aryloxy, arylalkyloxy, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —$CONH_2$, —CONHalkyl, —CONHaryl, —CONHarylalkyl or cases where there are two substituents on one nitrogen), and the like.

As used herein, "alkyl," refers to by itself or as part of another substituent, means, unless otherwise stated, a straight (i.e., unbranched) or branched carbon chain (or carbon), or a combination thereof, which may be fully saturated, mono- or polyunsaturated and can include mono-, di- and multivalent radicals. The alkyl group may contain up to 20 carbon atoms. The alkyl group may be C1 to C6 alkyl, or C1 to C4 alkyl, or C1 to C3 alkyl, or C1 to C2 alkyl. Non-limiting examples of such alkyl fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl.

As used herein, the term "cycloalkyl" refers to a univalent radical formed by removing one hydrogen atom from a cycloalkane. The cycloalkyl group as used herein may contain up to 8 carbon atoms. Non-limiting examples of such cyclic hydrocarbon (i.e. cycloalkyl) groups include, but are not limited to, cyclopropyl, cyclobutyl, cyclopentyl, cyclohexyl, norbornyl, and adamantyl. Branched cycloalkyl groups, such as exemplary 1-methylcyclopropyl and 2-methycyclopropyl groups, are included in the definition of cycloalkyl as used in the present disclosure As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly) oxybutylene (derived from butylene oxide, BO), as well as mixtures thereof.

As used herein, unless otherwise specified, the term "aryl" refers to an aromatic group containing only carbon in the aromatic ring(s), such as phenyl, biphenyl, naphthyl, anthracenyl, and the like. The term "heteroarene" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, thiozole, furan, benzofuran, thiophene, benzothiophene, isoxazole, pyrazole, triazole, tetrazole, indazole, purine, carbazole, imidazole, benzothiozole, and benzimidazole.

As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C═O (e.g. —C(O)—Oalkyl), for example methyl ester, ethyl ester, and pivaloyl ester substitution where the carbonyl functionality is bound to the rest of the compound.

As used herein, "halo" or "halogen" refers to by themselves or as part of another substituent, meaning, unless otherwise stated, a fluorine, chlorine, bromine, or iodine atom.

As used herein, "TWEEN 20," "TWEEN 40," "TWEEN 60," or "TWEEN 80" refers to a polysorbate and non-ionic surfactant which is sold under the heritage brand of Tween™.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

Embodiments of the present disclosure are directed towards a corrosion inhibitor composition. The corrosion inhibitor composition or "composition" of the present disclosure is effective in preventing or reducing the corrosion rate of metals that are in contact with aqueous fluids, particularly in the oil and gas industries. The metal may be iron, zinc, steel, or more specifically, carbon steel, or any combination thereof. The composition includes a polymer, a thioamide, a surfactant, a thioalcohol, and solvents which, when used in defined weight percentages, can be effective at very low concentrations (20-100 parts per million (ppm)) with a corrosion inhibition efficiency of greater than 90% when the metal is in contact with the corrosive fluid at 25 to 75° C. for 10 to 480 minutes by following ASTM G59 standard test method.

In an exemplary embodiment, the corrosion inhibitor composition is described. The composition includes a polymer. In some embodiments, the polymer may be present in the corrosion inhibitor composition in an amount of 1 to 30 wt. %, preferably 3-25 wt. %, preferably 5-20 wt. %, preferably 10-15 wt. %, and more preferably about 15 wt. %, based on a total weight of the composition. Other ranges are also possible.

In some embodiments, the polymer has at least one vinylpyrrolidone unit and at least one of other vinyl unit(s). In some other embodiments, the polymer may further include one or more copolymers of vinylpyrrolidone and/or viny unit(s). In some preferred embodiments, these copolymers may contain one or more other monomers in addition to vinylpyrrolidone and/or vinyl acetate. For example, the copolymer can be selected from a group consisting of vinyl acetate, vinyl caprolactam, vinyl imidazole, vinyl imidazolium methyl sulfate, sodium methacrylate, olefins, dimethylamino ethyl methacrylate, dimethylaminopropylmethacrylamide, dimethyl aminoethyl methacrylate, styrene, or a combination thereof. In a preferred embodiment, the copolymer is a vinyl acetate unit. In some embodiments, the preferred polymer used in the composition is poly(1-vinyl pyrrolidone-co-vinyl acetate). In some further preferred embodiments, the general structure of poly(1-vinylpyrolidone-co-vinylacetate) is a compound of formula (I).

[I]

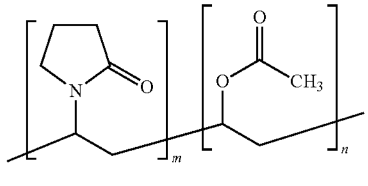

As depicted in formula (I), in some embodiments, m is an integer from 1 to 600 inclusive, preferably 50 to 500, preferably 100 to 400, preferably 150 to 300, or even preferably about 200. Other ranges are also possible. In some further embodiments, n is an integer from 1 to 600 inclusive, preferably 100 to 550, preferably 200 to 500, preferably 300 to 450, or even preferably about 400. Other ranges are also possible.

In some embodiments, the poly(1-vinylpyrolidone-co-vinylacetate) of formula (I) has an average molecular weight ($M_w$) of at least 20,000 g/mol, at least 30,000 g/mol, at least 40,000 g/mol, at least 50,000 g/mol, at least 70,000 g/mol, or at least 90,000 g/mol. In some further embodiments, the poly(1-vinylpyrolidone-co-vinylacetate) of formula (I) has an average molecular weight ($M_w$) of no more than 110,000 g/mol, no more than 90,000 g/mol, no more than 70,000 g/mol, no more than 50,000 g/mol, no more than 30,000 g/mol. Molecular weight determinations can be performed using GPC, using a cross-linked styrene-divinylbenzene column and calibrated to poly(ethylene oxide) references using a UV-VIS detector set at 254 nanometers (nm). Samples can be prepared at a concentration of 1 milligram per milliliter (mg/ml), and eluted at a flow rate of 1.0 milliliter per minute (ml/min). Other ranges are also possible.

As used herein, the term “glass transition temperature,” or “$T_g$” generally refers to the temperature range where the polymer substrate, such as a poly(1-vinylpyrolidone-co-vinylacetate), changes from a rigid glassy material to a soft (not melted) material. The $T_g$ of the poly(1-vinylpyrolidone-co-vinylacetate) therefore can be an indicator of its useful upper temperature limit. The $T_g$ of a polymer can depend primarily on the composition of the polymer. The $T_g$ described herein are measures of heat resistance and can be determined by differential scanning calorimetry. The calorimetry method can use a TA Instruments Q1000 instrument, for example, with setting of 20° C./min ramp rate, 40° C. start temperature, and 200° C. end temperature.

In some embodiments, the poly(1-vinylpyrolidone-co-vinylacetate) of formula (I) has a glass transition temperature of at least 45° C., at least 55° C., at least 65° C., at least 75° C., or no more than 85° C., no more than 75° C., no more than 65° C., no more than 55° C. Other ranges are also possible.

In some further embodiments, the poly(1-vinylpyrolidone-co-vinylacetate) of formula (I) has a density in a range of 1.10 to 1.3 g/mL, preferably 1.15 to 1.29 g/mL, preferably 1.20 to 1.28 g/mL, preferably 1.25 to 1.28 g/mL, or even more preferably 1.27 g/mL at 25° C., determined by any method well known in the art, for example, volume displacement method. Other ranges are also possible.

In some embodiments, the composition of the present disclosure may include other polymers (natural, synthetic, or a combination of both) in combination with the pyrrolidone vinyl acetate polymer. Natural polymers include chitosan, dextran, carboxymethyl cellulose, sodium alginate, pectin, hydroxyl ethyl cellulose, gum arabic, etc. Suitable examples of synthetic polymers are polymerized monomers of hydroxamic acids, benzothiazole, quinoxaline, imidazole, benzothiazine, chitosan, 8-hydro-quinoline, etc., or their derivatives. In some embodiments, the composition of the present disclosure may be used with other conventionally known green-based organic inhibitors such as flavonoids, alkaloids, and by-products of plants. In certain other embodiments, the composition of the present disclosure may be used with other conventionally known green-based inorganic inhibitors such as lanthanide salts, chromates, or a combination thereof.

In an embodiment, the corrosion inhibitor composition includes an amide. The amide may be present in the corrosion inhibitor composition in an amount of 0.1 to 5 wt. %, preferably 0.3-3 wt. %, preferably 0.5-2 wt. % preferably 0.7-1.5 wt. %, and more preferably 1 wt. %, based on a total weight of the composition. The amide can be a primary, secondary, or tertiary amide. The amide is a compound of structure (V). In an embodiment, the amide is a thioamide. The thioamide is a compound of structure (VI). The thioamide may have 2 to 20 carbon atoms, preferably 2-12 carbon atoms, and more preferably 5-7 carbon atoms. In one embodiment, the thioamide is at least one selected from the group consisting of thiobenzamide, 4-(trifluoromethoxyl) thiobenzamide, 4-(acetoxymethyl) thiobenzamide, 3,4-dimethyl thiobenzamide, 3-(acetoxymethyl) thiobenzamide, 4-(methylthio) thiobenzamide, 4-(acetoxy)thiobenzamide, 3-(acetoxy)thiobenzamide, 4-(2-methyl-4-thiazolyl)thiobenzamide. In a preferred embodiment, the thioamide is thiobenzamide. The thiobenzamide is a compound of structure (VII).

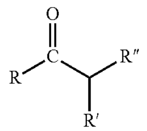

(V)

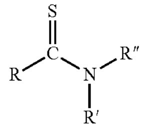

(VI)

Where R, R', and R" represent organic groups or hydrogen atoms.

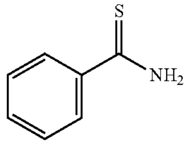

(VII)

In an embodiment, the thioalcohol may be present in the corrosion inhibitor composition in an amount of 1 to 15 wt. %, preferably 3-12 wt. %, preferably 5-9 wt. %, and more preferably about 5%, based on a total weight of the composition. Thioalcohols are a class of sulfur-containing organic compounds with the formula RSH, where R is an organic group. The thioalcohol is a compound with a structure of (VIII). In an embodiment, the thioalcohol may have 2 to 8 carbon atoms, preferably 3-5 carbon atoms, and more preferably about 2-3 carbon atoms. In one embodiment, the thioalcohol is at least one selected from the group consisting of 2-mercaptoethanol, 3-mercapto-1-propanol, 8-mercapto-1-octanol, 6-mercapto-1-hexanol, 9-mercapto-1-nonanol. In a preferred embodiment, the thioalcohol is 2-mercaptoethanol. The 2-mercaptoethanol is a compound with a structure of (IX).

(VIII)

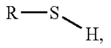

(IX)

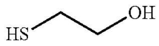

In some embodiments, the surfactant may be present in the corrosion inhibitor composition in an amount of 1 to 15 wt. %, preferably 2 to 10 wt. %, preferably 3 to 5 wt. %, and even more preferably about 3 wt. %, based on a total weight of the composition. The surfactant may be non-ionic, anionic, cationic, or amphoteric. A non-ionic surfactant has no charged groups in its head. In some embodiments, the non-ionic surfactants may include alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide. In some further embodiments, the non-ionic surfactants may include alkoxylated alkanolamides of fatty acids, preferably ethoxylated and/or propoxylated variants of the alkanolamides of fatty acids having anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide). In some preferred embodiments, the non-ionic surfactants may include amine oxides, such as N-cocoamidopropyl dimethyl amine oxide and dimethyl C6-C22 alkyl amine oxide (e.g., dimethyl coco amine oxide). In some further preferred embodiments, the non-ionic surfactants may include fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters. In some even further preferred embodiments, the non-ionic surfactants may include ethers, such as (i) alkoxylated C1-C22 alkanols, which may include alkoxylated C1-C5 alkanols, preferably ethoxylated or propoxylated C1-C5 alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated C6-C26 alkanols (including alkoxylated fatty alcohols), preferably alkoxylated C7-C22 alkanols, more preferably alkoxylated C8-C14 alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether), (ii) alkoxylated polysiloxanes, (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45), and (iv) alkoxylated alkylphenols.

Examples of surfactants include, but are not limited to, nonoxynol-9, poloxamers, tergitol, perfluorooctane sulfonate (PFOS), Pentax 99, benzalkonium chloride (BAC), cetylpyridinium chloride (CPC), and benzethonium chloride (BZT), betaines, and amino oxides. In an embodiment, the non-ionic surfactant is polyoxyethylene (20) sorbitan monooleate, in which R is an 8-heptadecene group having 17 carbon atoms (represented by formula (X).

[X]

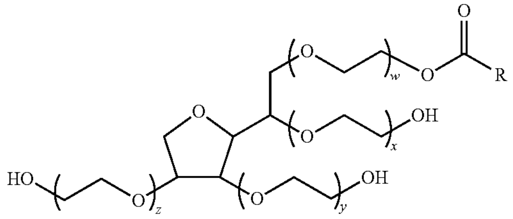

where R is selected from the group consisting of a hydrocarbon chain having 8 to 22 carbon atoms, an optionally substituted alkyl, and an optionally substituted cycloalkyl group. In some embodiments, each of w, x, y, and z are an integer from 1 to 20 inclusive and w+x+y+z=20.

In one embodiment, the surfactant may be TWEEN 80 or polysorbate 80 (represented by formula (XII).

(XII)

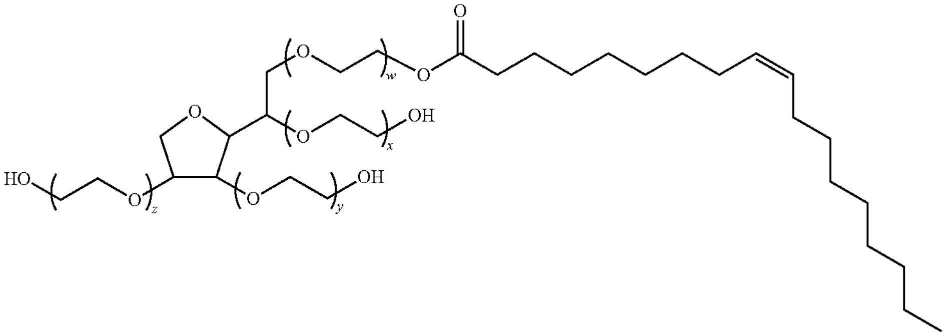

x+y+z=20

In a further embodiment, the surfactant may further include TWEEN 20 (or polysorbate 20), TWEEN 40 (or polysorbate 40), and TWEEN 60 (or polysorbate 60).

In an embodiment, the corrosion inhibitor composition includes an alcohol. The alcohol may be present in the corrosion inhibitor composition in an amount of 0 to 30 wt. %, preferably 5 to 25 wt. %, preferably 10 to 20 wt. %, and more preferably about 15 wt. %, based on a total weight of the composition. The alcohol may be an aliphatic alcohol and/or aromatic alcohol. In an embodiment, the alcohol is an aromatic alcohol. Suitable examples of aromatic alcohols include, but are not limited to, tryptophol, tyrosol, phenethyl alcohol (phenyl ethanol), benzyl alcohol, etcetera. In another preferred embodiment, the alcohol is an aliphatic alcohol. The aliphatic alcohols may have 1 to 8 carbon atoms, preferably 2-5 carbon atoms, and more preferably, the aliphatic alcohol has 2-3 carbon atoms. Suitable examples of the aliphatic alcohols used in the composition include ethanol, methanol, propanol, isopropyl alcohol, butanol, isobutanol, or a combination thereof. In an embodiment, the composition may use a combination of the aliphatic alcohol and an aromatic alcohol. In a preferred embodiment, the aliphatic alcohol is methanol.

In an embodiment, the corrosion inhibitor composition includes a solvent. The solvent may be present in the corrosion inhibitor composition in an amount of 30-80 wt. %, preferably 40-70 wt. %, preferably 50-60 wt. %, and more preferably about 60 wt. %, based on a total weight of the composition. The solvent may be polar, nonpolar, or a combination thereof. In an embodiment, the solvent is a polar solvent, such as water, acetone, acetonitrile, dimethylformamide (DMF), dimethyl sulfoxide (DMSO), isopropanol, methanol, or a combination thereof. In another embodiment, a non-polar solvent such as alkanes (pentane, hexane, and heptane) or aromatic solvents (benzene, toluene, and xylene) can be used as the solvent. In a preferred embodiment, the solvent is polar, and the preferred polar solvent is water. Using a polar solvent such as water overcomes the drawbacks, such as toxicity, associated with conventionally used organic solvents in corrosion inhibitor compositions.

The composition of the corrosion inhibitor may also be understood in terms of relative ratios of certain components of which the corrosion inhibitor is comprised. In some embodiments, the corrosion inhibitor has a ratio of an amount of polymer present to an amount of thioalcohol present of 6:1 to 1:3, preferably 5:1 to 1:2, preferably 4:1 to 1:1, or even more preferably 3:1. In some embodiments, the corrosion inhibitor has a ratio of an amount of polymer present to an amount of aliphatic alcohol present of 6:1 to 1:6, preferably 4:1 to 1:4, preferably 2:1 to 1:2, or even more preferably 1:1. In some embodiments, the corrosion inhibitor has a ratio of an amount of polymer present to an amount of surfactant present of 10:1 to 1:10, preferably 8:1 to 1:4, preferably 6:1 to 1:2, or even more preferably 5:1. Other ranges are also possible.

In general, the corrosion inhibitor composition may be used in conjunction with other suitable corrosion inhibitors known to one of ordinary skill in the art. In some embodiments, the corrosion inhibitor may further comprise a secondary corrosion inhibitor. The secondary corrosion inhibitor may refer to any chemical compound or mixture thereof known by one of ordinary skill in the art to act as a corrosion inhibitor, particularly for inhibiting corrosion of steel and/or in $CO_2$-containing solutions. Such secondary corrosion inhibitors may be quinolines, imidazolines, thioureas, pyridines and their various derivatives, alkenylphenones, amines, amides, acetylenic alcohols, quaternary salts, sulfoxides, thioethers, mercaptans, thiazoles, and thiocyanates.

In some embodiments, the corrosion inhibitor composition may further comprise a co-solvent. As used herein, a co-solvent refers to a chemical compound added to the corrosion inhibitor primarily for the purposes of enhancing the water solubility or oil solubility of the corrosion inhibitor. Preferably, the co-solvent does not participate in chemical reactions which prevent corrosion. Examples of co-solvents include water, glycerins, glycols (e.g., polyglycols, propylene glycol, and ethylene glycol), polyglycol amines, polyols, any derivative thereof, and any combination thereof.

In general, the corrosion inhibitor composition described herein may be prepared using any suitable technique or combination of techniques known to one of ordinary skill in the art. In some embodiments, the components of the corrosion inhibitor are added to a single container. In such embodiments, the components may be added in sequence. In alternative embodiments, the components may be added simultaneously. In some embodiments, the solvent is provided first, and other components are added to the solvent. In some embodiments, the corrosion inhibitor is prepared before being added to the corrosive fluid. In alternative embodiments, the corrosion inhibitor is prepared by addition of the components of the corrosion inhibitor to the corrosive fluid, e.g., downhole. Such addition may be successive or simultaneous.

In an exemplary embodiment, a method for inhibiting corrosion of a metal in contact with a corrosive fluid is described. The method includes adding a corrosive fluid the corrosion inhibitor composition in an amount of 10 to 1000 ppm, preferably 15 to 750 ppm, preferably 20 to 500 ppm, preferably 25 to 400 ppm, preferably 30 to 300 ppm, preferably 35 to 250 ppm, preferably 40 to 200 ppm, preferably 45 to 150 ppm, preferably 50 to 100 ppm, and more preferably 100 ppm, based on a total number of parts by weight of the corrosive fluid. Generally, the corrosive fluid is an acid, alkali, base, or caustic solution, which corrodes elements such as metal. Some examples of corrosive liquids contain at least one selected from the group consisting of sulfuric acid, hydrofluoric acid, chromic acid, nitric acid, acetic acid, hydrochloric acid, or a combination thereof. In some embodiments, the corrosive fluid is an aqueous solution.

In an embodiment, the corrosive fluid includes carbon dioxide ($CO_2$) and/or halides (R—X) in an amount of at least 0.5 grams (g) carbon dioxide and/or halides per kilograms (kg) of the corrosive fluid, preferably at least 1 g per kg of the corrosive fluid, preferably at least 5 g per kg of the corrosive fluid, preferably at least 10 g per kg of the corrosive fluid, preferably at least 25 g per kg of the corrosive fluid, preferably at least 50 g per kg of the corrosive fluid, preferably at least 100 g per kg of the corrosive fluid, preferably at least 150 g per kg of the corrosive fluid, preferably at least 200 g per kg of the corrosive fluid.

In another embodiment, the halides are in the form of an alkali metal halide (MX; where M is an alkali metal and X is a halogen) salt. In another embodiment, the alkali metal halide salt is present in an amount of 1 to 5 wt. % based on the total weight of the corrosive fluid. Examples of alkali metal halides are sodium chloride, potassium chloride, lithium chloride, lithium bromide, sodium bromide, potassium bromide, lithium iodide, sodium iodide, and potassium iodide. In a further preferred embodiment, the alkali metal halide salt is sodium chloride (NaCl).

In some embodiments, the halide salt is present in the corrosive fluid in an amount of 1 to 5 wt %, preferably 1.25 to 4.9 wt %, preferably 1.5 to 4.8 wt %, preferably 1.75 to 4.7 wt %, preferably 1.9 to 4.6 wt %, preferably 2 to 4.5 wt %, preferably 2.1 to 4.4 wt %, preferably 2.2 to 4.3 wt %, preferably 2.3 to 4.2 wt %, preferably 2.4 to 4.1 wt %, preferably 2.5 to 4 wt %, preferably 2.6 to 3.9 wt %, preferably 2.7 to 3.8 wt %, preferably 2.8 to 3.75 wt %, preferably 2.9 to 3.7 wt %, preferably 3 to 3.6 wt %, preferably 3.25 to 3.55 wt %, preferably about 3.5 wt %, based on a total weight of corrosive fluid.

In some embodiments, the corrosive fluid comprises an aqueous solution. Carbon dioxide dissolves in water to create a corrosive solution of dissolved carbon dioxide and carbonic acid. In the oil and gas industry, the mixture of water and carbon dioxide (which may be referred to as "wet carbon dioxide" in situations where the total amount of carbon dioxide exceeds the total amount of water) is frequently encountered during a variety of normal procedures related to oil and gas production. Examples of such procedures include natural gas well drilling, natural gas production, primary oil recovery, secondary oil recovery, tertiary oil recovery, carbon dioxide flooding, and carbon capture and sequestration. In these procedures, carbon dioxide may exist as a gas, liquid, or supercritical fluid. The carbon dioxide may be dissolved into water or some other fluid such as oil. Alternatively, water may dissolve into liquid or supercritical carbon dioxide. In each of these cases, the presence of both carbon dioxide and water will create a corrosive fluid relevant to the corrosion inhibitor of the present disclosure. The amount of carbon dioxide may also be measured based on a partial pressure of carbon dioxide. Typically, corrosion becomes of particular concern for carbon dioxide partial pressures above 1 bar.

In some embodiments, the corrosive fluid comprises an organic solvent. Examples of organic solvents which may be present in the corrosive fluid include, but are not limited to alcohol solvents as described above, ketone solvents such as acetone, methyl ethyl ketone (MEK); amide solvents such as formamide, dimethyl formamide, dimethyl acetamide; halogenated solvents such as carbon tetrachloride, chloroform, bromoform, iodoform, and methylene chloride (also known as dichloromethane); organic acid solvents such as acetic acid, formic acid, and trifluoroacetic acid; aromatic solvents such as benzene, xylenes, toluene, and naptha; ether solvents such as tetrahydrofuran, diethyl ether, and 1,4-dioxane; nitrated solvents such as nitromethane and nitroethane; and ester-containing solvents such as ethyl acetate.

In some embodiments, the corrosive fluid comprises natural or refined petroleum. In some embodiments, the natural or refined petroleum is part of an emulsion. This emulsion may be an oil-in-water emulsion or a water-in-oil emulsion. In some embodiments, the corrosive fluid comprises natural gas. The natural gas may be dissolved in the corrosive fluid or may be a gaseous component of a multiphase mixture which makes up the corrosive fluid, at least one component of which is a liquid. This natural gas may comprise gaseous hydrocarbons, examples of which include alkanes such as methane, ethane, propane, and n-butane, and isobutane; alkenes such as ethane (also known as ethylene) and propene (also known as propylene); and alkynes such as ethyne (also known as acetylene). The natural gas may also comprise carbon monoxide, mercaptans such as methanethiol and ethanethiol, amines such as ammonia and methylamine, and water vapor.

In preferred embodiments, the corrosive fluid is substantially free of hydrogen sulfide. In this context, "substantially free of hydrogen sulfide" may refer to hydrogen sulfide being present in the corrosive fluid in an amount less than 0.5 wt %, preferably less than 0.25 wt %, preferably less than 0.1 wt %, preferably less than 0.05 wt %, preferably less than 0.01 wt %, preferably less than 0.005 wt %, preferably less than 0.001 wt %, preferably less than 0.0001 wt %, or even more preferably less than 0.00001 wt %, based on a total weight of corrosive fluid. Alternatively, the amount of hydrogen sulfide may be a relative amount based on an amount of carbon dioxide present in the corrosive fluid. Using such a metric for measuring the amount of hydrogen sulfide, the corrosive fluid preferably has a ratio of the amount of carbon dioxide to the amount of hydrogen sulfide of greater than 30:1, preferably greater than 50:1, preferably greater than 100:1, preferably greater than 150:1, preferably greater than 200:1, preferably greater than 250:1, preferably greater than 300:1, preferably greater than 350:1, preferably greater than 400:1, preferably greater than 450:1, or even more preferably greater than 500:1. In preferred embodiments, the corrosive fluid is devoid of hydrogen sulfide.

The corrosive fluid may optionally further include one or more additives. These additives may be purposefully added to modify the properties or functions of the corrosive fluid, as needed or be inadvertently incorporated into the corrosive fluid through contact between the corrosive fluid or constituents thereof with an additive or additive-containing fluid. Typically, when present, the additive(s) may be incorporated in an amount of less than 10%, preferably less than 8%, preferably less than 6%, preferably less than 4%, preferably less than 2%, preferably less than 1%, preferably less than 0.5%, preferably less than 0.1% by weight per total volume of the corrosive fluid.

Additive(s) suitable for use in oil and gas well operations are known by those of ordinary skill in the art, and may include, but are not limited to (i) viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite; (ii) chelating agents, such as chelating agents useful as sequesteration agents of metal ions, for example iron control agents, such as ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA); (iii) stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates; (iv) dispersing agents e.g., polymeric or co-polymeric compounds of polyacrylic acid, polyacrylic acid/maleic acid copolymers, styrene/maleic anhydride copolymers, polymethacrylic acid and polyaspartic acid; (v) scale inhibitors e.g., sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and copolymers thereof; (vi) defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts; (vii) emulsifiers such as a tallow amine, a ditallow amine, or combinations thereof, for example a 50% concentration of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol; and (viii) surfactants such as non-ionic surfactants as described above, cationic surfactants, anionic surfactants, and amphoteric surfactants.

Cationic surfactants may include, but are not limited to (i) a protonated amine formed from a reaction between a C6-C26 alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of C6-C26 alkyl monoamines, C6-C26 alkyl (poly)alkylene polyamines, and alkoxylated fatty amines; (ii) a protonated C6-C26 alkyl amidoamine formed from a reaction between a C6-C26 alkyl amidoamine compound and an acid (for example the acids listed above), such as protonated forms of the amide reaction product between any fatty acid 20 previously listed (or ester derivative thereof) with a polyamine (e.g., putrescine, cadaverine, ethylene diamine, N,N-dimethylethane-1,2-diamine, N,N-dimethylpropane-1,3-diamine, N,N-diethylethane-1,2-diamine, N,N-diethylpropane-1,3-diamine, spermidine, 1,1,1-tris(aminomethyl)ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldimethylamine, stearamidoethyldiethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and (iii) a quaternary ammonium compound made from alkylation with suitable alkylating agents (e.g., dimethyl sulfate, methyl chloride or bromide, benzyl chloride or bromide, C6-C26 alkyl chloride or bromide, etc.) of a tertiary C6-C26 alkyl amine, an alkoxylated (tertiary) amine, or an aprotic nitrogenous heteroarene (optionally substituted) having at least one aromatic nitrogen atom with a reactive lone pair of electrons, with specific mention being made to a C10-C18 alkyl trimethylammonium chloride or methosulfate, a di-C10-C18 alkyl dimethyl ammonium chloride or methesulfate, a C10-C18 alkyl benzyl dimethyl ammonium chloride, a methyl quaternized C6-C22 alkyl propylene diamine, a methyl quaternized C6-C22 alkyl propylene triamine, a methyl quaternized C6-C22 alkyl propylene tetraamine, a N—C10-C18 alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, Ndodecyl pyridinium chloride, N-cyclohexyl pyridinium bromide, naphthyl methylquinolinium chloride, naphthyl methyl pyridinium chloride, and cetylpyridinium chloride.

Anionic surfactants may include, but are not limited to (i) sulfates, such as alkyl sulfates, alkyl-ester-sulfates, alkyl ether sulfates, alkylalkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate; (ii) sulfonates such as dodecyl benzene sulfonate, lower alkyl-benzene sulfonates, alpha olefin sulfonates, lignosulfonates, sulfo-carboxylic compounds; (iii) phosphates of fatty alcohols or polyoxyalkylene ethers of fatty alcohols such as cetyl phosphate salts, dicetyl phosphate salts, ceteth-10-phosphate salts; and (iv) carboxylate salts of fatty acids, acylamino acids, lactylates, and/or fatty alcohols/polyoxyalkylene ethers of fatty alcohols such as sodium stearate, sodium behenoyl lactylate, sodium isostearoyl lactylate, sodium caproyl lactylate, sodium laureth-5 carboxylate, sodium laureth-6 carboxylate, sodium laureth-11 carboxylate.

Amphoteric surfactants may include, but are not limited to (i) C6-C22 alkyl dialkyl betaines, such as fatty dimethyl betaines (R—N(CH3)2(+)—CH2COO—), obtained from a C6-C22 alkyl dimethyl amine which is reacted with a monohaloacetate salt (e.g., sodium monochloroacetate), such as C12-C14 dimethyl betaine (carboxylate methyl C12-C14 alkyl dimethylammonium); (ii) C6-C22 alkyl amido betaines (R—CO—NH—CH2CH2CH2-N(CH3)2(+)—CH2COO— or R—CO—NH—CH2CH2-N(CH3)2(+)—CH2COO—), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as C10-C18 amidopropyl dimethylamino betaine; and (iii) C6-C22 alkyl sultaines or C6-C22 alkyl amido sultaines, which are similar to those C6-C22 alkyl dialkyl betaines or C6-C22 alkyl amido betaines described above except in which the carboxylic group has been substituted by a sulfonic group (R—N(CH3)2(+)—CH2CH2CH2SO3- or R—CO—NH—CH2CH2CH2-N(CH3)2(+)—CH2CH2CH2SO3- or R—CO—NH—CH2CH2-N(CH3)2(+)—CH2CH2CH2SO3-) or a hydroxysulfonic group (R—N(CH3)2(+)—CH2CH(OH)—CH2SO3- or R—CO—NHCH2CH2CH2-N(CH3)2(+)—CH2CH(OH)—CH2SO3- or R—CO—NH—CH2CH2-N(CH3)2(+)—CH2CH(OH)—CH2SO3-), such as C10-C18 dimethyl hydroxysultaine and C10-C18 amido propyl dimethylamino hydroxysultaine.

In some embodiments, the corrosive fluid is substantially free of additives (e.g., viscosity modifying agents, chelating agents, stabilizing agents, dispersing agents, scale inhibitors, defoaming agents, and/or surfactants).

Typical metals found in oil and gas field environments that may be protected include carbon steels (e.g., mild steels, high-tensile steels, higher-carbon steels), including American Petroleum Institute (API) carbon steels; high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof. Specific examples of typical oil field tubular steels include X60, J-55, N-80, L-80, P:105, P110, and high alloy chrome steels such as Cr-9, Cr-13, Cr-2205, Cr-2250, and the like. In some preferred embodiments, the methods herein inhibit corrosion of a steel. In some preferred embodiments, the metal is a carbon steel, such as AISI 1018 carbon steel or API X-60 carbon steel.

The composition of the present disclosure helps protect oxidizable metal surfaces, particularly surfaces of objects formed from iron and steel. This can be achieved by applying the composition on the whole or a part of any metal surface susceptible to corrosion. The composition of the present disclosure is beneficial for treating metal surfaces such as metal pipes, casings, pumps, screens, valves, or any other fittings in oil, gas, and geothermal wells which are subjected to high temperatures and pressures and corrosive chemical agents, or for pipelines in which are transported fluids that contain water.

The metal surfaces, when treated with the corrosion inhibitor composition of the present discourse, demonstrate an inhibition efficiency of greater than 90% when the metal is in contact with the corrosive fluid at 25 to 75° C. for 10 to 480 minutes by following American Society for Testing and Materials (ASTM) G59 standard test method.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight of the metal during reference time), area (initial surface area of the metal), time (length of exposure time) and density of the metal. Corrosion rate may be measured according to the American Society for Testing and Materials (ASTM) standard weight loss (immersion) test (e.g., according to ASTM G3 and G59 and described in the Examples), and may be computed using mils penetration per year (mpy). In some embodiments, the method provides a corrosion rate of 1 to 25 mpy, preferably 2.5 to 15 mpy, preferably 3 to 10 mpy, preferably 5 to 9.5 mpy, preferably 5.5 to 9 mpy, preferably 5.75 to 8.50 mpy, when the metal is treated with the corrosive fluid containing 3.5 wt. % NaCl, saturated carbon dioxide, and 50 to 100 ppm of the corrosion inhibitor at 55° C.

Corrosion inhibition efficiencies (IE %) may be measured by comparing the corrosion rates obtained from corrosive fluids with and without corrosion inhibitors using weight loss (immersion) studies, electrochemical impedance spectroscopy (EIS), potentiodynamic polarization (PDP), Linear polarization resistance (LPR) or other similar methods. In some embodiments, the method described herein achieves a corrosion inhibition efficiency of greater than 90%, preferably greater than 90.25%, preferably greater than 90.5%, preferably greater than 90.75%, preferably greater than 91%, preferably greater than 91.25%, preferably greater than 91.5%, preferably greater than 91.75%, preferably greater than 92%, preferably greater than 92.25%, preferably greater than 92.5%, preferably greater than 92.75%, preferably greater than 93%, preferably greater than 93.25%, preferably greater than 93.5%, preferably greater than 93.75%, preferably greater than 94%, preferably greater than 94.25%, preferably greater than 94.5%, preferably greater than 94.75%, preferably greater than 95%, greater than 95.2% when the metal is treated with the corrosive fluid containing 3.5 wt. % NaCl, saturated carbon dioxide, and 50 to 100 ppm of the corrosion inhibitor at 55° C.

In some embodiments, the metal surfaces can also be protected by dipping or spraying the surfaces with the compositions of the present disclosure and then allowing excess fluid to drain from the treated surfaces under ambient conditions. A protective film is thus formed on the metal surface without conventional heat-curing or extended air-drying treatment. However, such drying treatments can be used if desired and if conditions permit it. The advantage of using an anti-corrosion system that does not require air- or heat-drying is that the system can be applied to metal surfaces that are hundreds or thousands of feet below ground level or in an environment that is constantly flooded with brine or other fluids.

In some embodiments, a protective film is formed on the metal surface after subjecting the metal surface to heat treatments upon application of the composition. The corrosion inhibitor acts to inhibit corrosion in corrosive fluids and at temperatures even up to 100° C., for example at temperatures of 25 to 100° C., preferably 27.5 to 90° C., preferably 30 to 80° C., preferably 35 to 75° C., preferably 40 to 70° C., preferably 45 to 65° C., preferably 50 to 60° C. In preferred embodiments, the oil and gas well is treated with the corrosive fluid at a temperature of 40 to 75° C., preferably 45 to 65° C., preferably 50 to 60° C., preferably 55° C. Other ranges are also possible.

When applying the composition to the metal tubing of, for example, a gas or oil well or a pipeline, it is not necessary to pre-coat the treated metal surfaces with oil or other substances before applying the composition of the present disclosure. The treated surfaces may or may not have an oil coating before the application. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionating columns, cracking units, pump parts (e.g., parts of beam pumps), and in particular downhole surfaces that are most likely to come into contact with the corrosive fluid during stimulation operations, matrix acidizing operations, and/or carbon dioxide flooding operations, such as those casings, liners, pipes, bars, pump parts such as sucker rods, electrical submersible pumps, screens, valves, fittings, and the like.

The composition can be an effective corrosion inhibitor because their functional groups can form complexes with metal ions on the metal surface. These complexes occupy a large surface area, thereby blanketing the surface and protecting the metal from corrosive agents present in the corrosive fluids. The presence of heteroatoms such as nitrogen (N) and oxygen (O) atoms provide active centers for interacting with the pipeline surface, thereby protecting it from corrosion.

EXAMPLES

The following examples demonstrate a corrosion inhibitor composition, as described herein. The examples are provided solely for illustration and are not to be construed as limitations of the present disclosure, as many variations thereof are possible without departing from the spirit and scope of the present disclosure.

Example 1: Corrosion Inhibitor Composition

The composition of the present disclosure includes poly (1-vinylpyrrolidone-co-vinyl acetate), thiobenzamide, 2-mercaptoethanol, Tween 80 or polysorbate 80, methanol, and water. Each ingredient in the composition is mixed in different weight percentages, as provided in Table 1.

TABLE 1

Composition of the corrosion inhibitor formulation

| Corrosion inhibitor formulation | Weight % |
|---|---|
| Poly(1-vinylpyrolidone-co-vinylacetate) | 15 |
| Thiobenzamide | 1 |
| 2-mercaptoethanol | 5 |
| Tween 80 | 3 |
| Water | 60 |
| Methanol | 15 |

Example 2: Corrosion Inhibition Evaluation

The performance of the corrosion inhibitor composition was determined according to the G3 and G59 ASTM standard methods [ASTM-G3-14(2019): Standard Practice for Conventions Applicable to Electrochemical Measurements in Corrosion Testing; ASTM-G0059-97R20: Standard Test Method for Conducting Potentiodynamic Polarization Resistance Measurements]. Cylindrical carbon steel (C-1018) coupon with an exposed surface area of 5.23 square centimeters ($cm^2$) was used for corrosion testing. 100 ppm was used to evaluate the performance of the corrosion inhibitor composition. The test was carried out at a temperature of 55° C. in a 3.5% NaCl solution (blank). The $CO_2$ gas was bubbled through the blank solution for the first two hours to de-aerate and was continuously bubbled throughout the experiment to simulate sweet corrosive conditions. Furthermore, the solution was continuously stirred at a flow speed of 500 rpm throughout the test. After 2 hours of purging the corrosive solution with $CO_2$ and the test temperature set at 55° C., the test coupon was immersed into the corrosion cell, and open circuit potential (OCP) was measured for 1 h to ensure the stability of the potential with time. Finally, the corrosion measurements using linear polarization resistance (LPR) and potentiodynamic polarization measurements (PDP) were performed after another 2 h after the OCP measurements. LPR was performed within ±20 mV/Eco using 0.167 milliVolts per second (mV/s) as the scan rate. Finally, the PDP curves were measured with potentials from −250 to +250 mV vs. The saturated calomel electrode (SCE) using a 0.5 mV/s scan rate. The corrosion inhibitor performance from LPR results was then calculated as percent corrosion protection with respect to the uninhibited baseline (CRu) and the inhibited (CRi) corrosion rates during the 2 h pre-corrosion period before the addition of the inhibitor (Eq. 1).

$$IE_{LPR}=(CRu-CRi)/CRu-100 \quad (1)$$

The inhibition efficiency was also calculated from potentiodynamic polarization data from Eq. 2.

$$IE_{PDP}=1-\frac{i_{corr(inh)}}{i_{corr(blank)}}\times 100 \quad (2)$$

where $i_{corr\ (blank)}$ and $i_{corr\ (inh)}$ are, respectively, the corrosion current density recorded in the absence and presence of corrosion inhibitor formulation.

Example 3: Linear Polarization Resistance

FIG. 1 shows the variation of LPR of the carbon steel coupons over a period of 24 h with the corrosion inhibitor composition as provided in Table 1. The corrosion inhibitor composition was added after subjecting the carbon steel coupons to 2 h of pre-corrosion. After the addition of 100 ppm of the composition, the corrosion rate which was 187.2 mils penetration per year (mpy) during pre-corrosion, decreased to or dropped to 5.414 mpy, indicating a corrosion protective efficiency of about 97.1%, as can be observed from FIG. 1. The efficiency proves that the corrosion inhibition composition of the present disclosure is an excellent corrosion inhibitor for carbon steel under sweet corrosive conditions.

Example 4: Potentiodynamic Polarization

Figure 2:
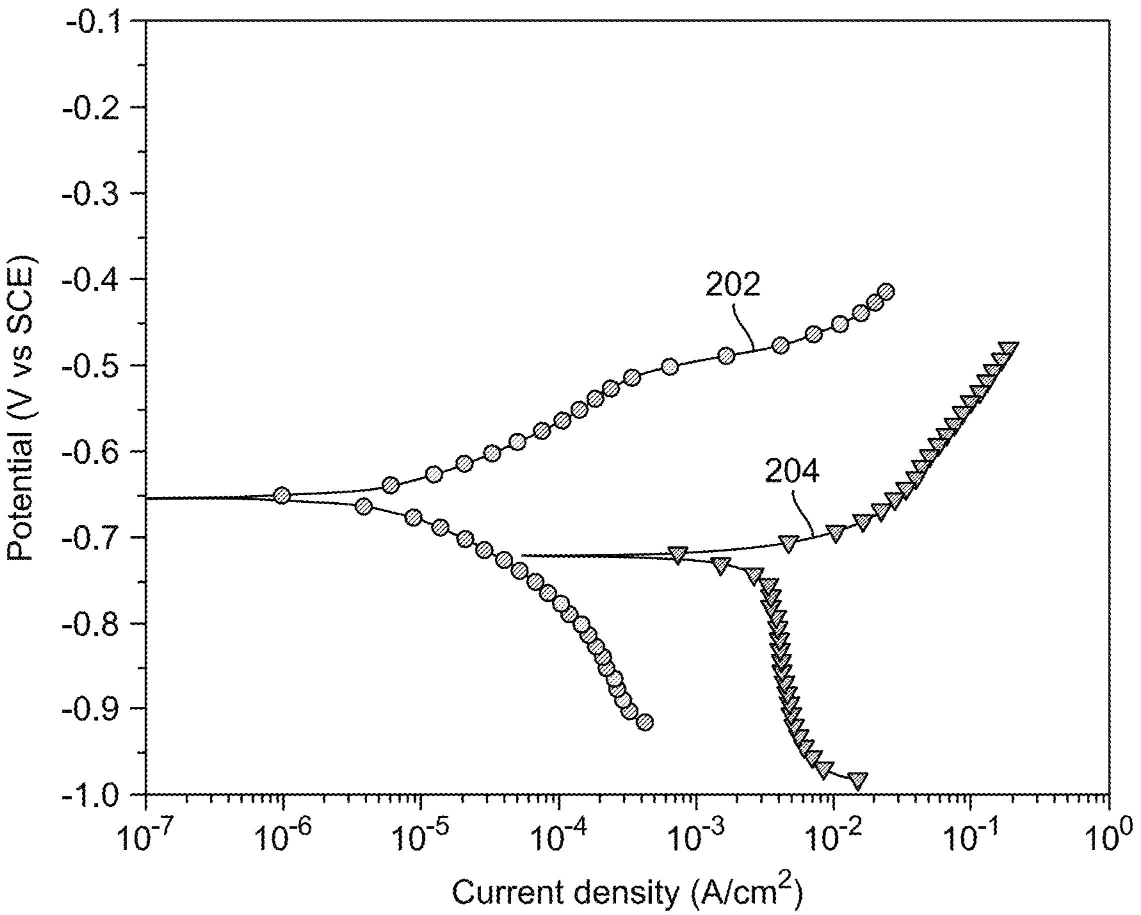
FIG. 2 illustrates Tafel plots for the C1018 carbon steel coupon in 3.5 wt. % NaCl in saturated $CO_2$ at 55° C. without and after the addition of 100 ppm of the corrosion inhibitor composition, according to certain embodiments.

PDP (Tafel) plots were obtained to further investigate the anodic and cathodic electrochemical processes on the C1018 carbon steel surface during the corrosion and the corrosion inhibition processes. FIG. 2 shows the PDP (Tafel) curves for C1018 carbon steel in 3.5% NaCl in saturated $CO_2$ at 55° C. without (204) and after the addition of 100 ppm (202) of the composition. The various kinetic electrochemical corrosion parameters, such as corrosion current density ($i_{corr}$), corrosion potential ($E_{corr}$), and corrosion rates (mpy) from the extrapolation of the anodic and cathodic Tafel lines, are provided in Table 2.

It is evident from FIG. 2 and Table 2 that adding 100 ppm of the composition shifted the potential to the anodic side compared to the shift observed with the blank. The change clearly shows that the inhibitor is anodic. The $E_{corr}$ was shifted from −722 mV to −545 mV with the addition of 100 ppm of the composition. The corrosion current density decreased from 430 $\mu A/cm^2$ to 3.29 $\mu A/cm^2$. The decrease in density reduces the corrosion rate of the C1018 carbon steel from 196.3 mpy (blank) to 1.50 mpy with the addition of 100 ppm of the composition, indicating an inhibition efficiency of 99.2%. The results indicate that the two electrochemical results (LPR and PDP) agree with each other.

TABLE 2

PDP data for C1018 carbon steel coupon in 3.5 wt. % NaCl in saturated $CO_2$ at 55° C. without and after the addition of 100 ppm of the corrosion inhibitor composition

| | PDP results | | | |
|---|---|---|---|---|
| System/Conc. | $E_{corr}$ (mV) | $I_{corr}$ ($\mu A/cm^2$) | CR (mpy) | Inhibition Efficiency (%) |
| Blank (3.5 wt. % NaCl) | −722 | 430 | 196.3 | — |
| Corrosion inhibition composition (100 ppm) | −545 | 3.29 | 1.5 | 99.2 |

The present disclosure relates to a composition as a corrosion inhibitor to prevent corrosion of metals in contact with aqueous fluids common in oil and gas industries. The corrosion inhibitor composition includes a polymer, a thioamide, a surfactant, a thioalcohol, and solvents. The composition is very effective against corrosion of metals in contact with aqueous sweet corrosive brine media when used in a dosage from 20-100 ppm. The composition of the present disclosure can replace conventionally used imidazoline-based compositions in the oil and gas industries, where the cost, toxicity, and cases of localized corrosion make their use undesirable or where disposal of effluents containing toxic inhibitor compositions raises serious water pollution problems.

Numerous modifications and variations of the present disclosure are possible in light of the above teachings. It is therefore to be understood that within the scope of the appended claims, the invention may be practiced otherwise than as specifically described herein.

The invention claimed is:

1. A method for inhibiting corrosion of a metal in contact with a corrosive fluid, the method comprising:

adding to a corrosive fluid the corrosion inhibitor composition in an amount of 10 to 1000 ppm based on a total number of parts by weight of the corrosive fluid, wherein the corrosive fluid comprises carbon dioxide and/or halides in an amount of at least 0.5 g carbon dioxide and/or halides per kg of the corrosive fluid, and wherein the corrosion inhibitor composition comprises:

1 to 15 wt % of a polymer having at least one vinylpyrrolidone unit and at least one vinyl acetate unit;

0.1 to 1 wt % of a thioamide having 2 to 20 carbon atoms;

1 to 5 wt % of a thioalcohol having 2 to 8 carbon atoms;

1 to 3 wt % of a surfactant;

0 to 15 wt % of an aliphatic alcohol having 1 to 8 carbon atoms; and 30 to 60 wt % of a solvent, each wt % based on a total weight of the corrosion inhibitor composition.

2. The method of claim 1, wherein the corrosion inhibitor composition, the polymer is a poly(1-vinylpyrolidone-co-vinylacetate).

3. The method of claim 2, wherein the poly(1-vinylpyrolidone-co-vinylacetate) has a formula (I)

[I]

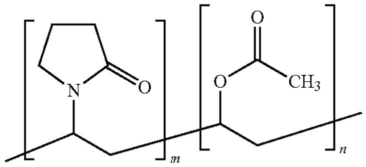

wherein:

m is an integer of from 1 to 600 inclusive; and n is an integer of from 1 to 600 inclusive.

4. The method of claim 1, wherein the corrosion inhibitor composition, the thioamide is thiobenzamide.

5. The method of claim 1, wherein the corrosion inhibitor composition, the thioalcohol is 2-mercaptoethanol.

6. The method of claim 1, wherein the corrosion inhibitor composition, the surfactant is a non-ionic surfactant of formula (II)

[II]

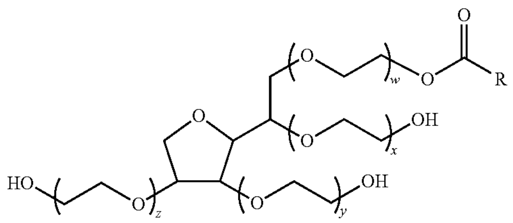

wherein:

R is selected from the group consisting of a hydrocarbon chain having 8 to 22 carbon atoms, an optionally substituted alkyl, and an optionally substituted cycloalkyl;

each of w, x, y, and z is an integer of from 1 to 20 inclusive; and w+x+y+z=20.

7. The method of claim 6, wherein the non-ionic surfactant is polyoxyethylene (20) sorbitan monooleate, in which R is an 8-heptadecene group having 17 carbon atoms.

8. The method of claim 1, wherein the corrosion inhibitor composition, the aliphatic alcohol is methanol.

9. The method of claim 1, wherein the corrosion inhibitor composition, the solvent is water.

10. The method of claim 1, wherein the corrosive fluid is an aqueous solution.

11. The method of claim 10, wherein the halides are in the form of an alkali metal halide salt.

12. The method of claim 11, wherein the alkali metal halide salt is present in an amount of 1 to 5 wt % based on a total weight of the corrosive fluid.

13. The method of claim 11, wherein the alkali metal halide salt is sodium chloride.

14. The method of claim 1, wherein the metal is a steel.

15. The method of claim 14, wherein the steel is a carbon steel.

16. The method of claim 1, wherein the metal is in contact with the corrosive fluid at 25 to 100° C.

17. The method of claim 1, wherein the metal is part of a casing, a pipe, a pump, a screen, a valve, or a fitting of an oil or gas well.

18. The method of claim 1, which has an inhibition efficiency of greater than 90% when the metal is in contact with the corrosive fluid at 25 to 75° C. for 10 to 480 minutes by following ASTM G59 standard test method.

* * * * *